Figure 1:
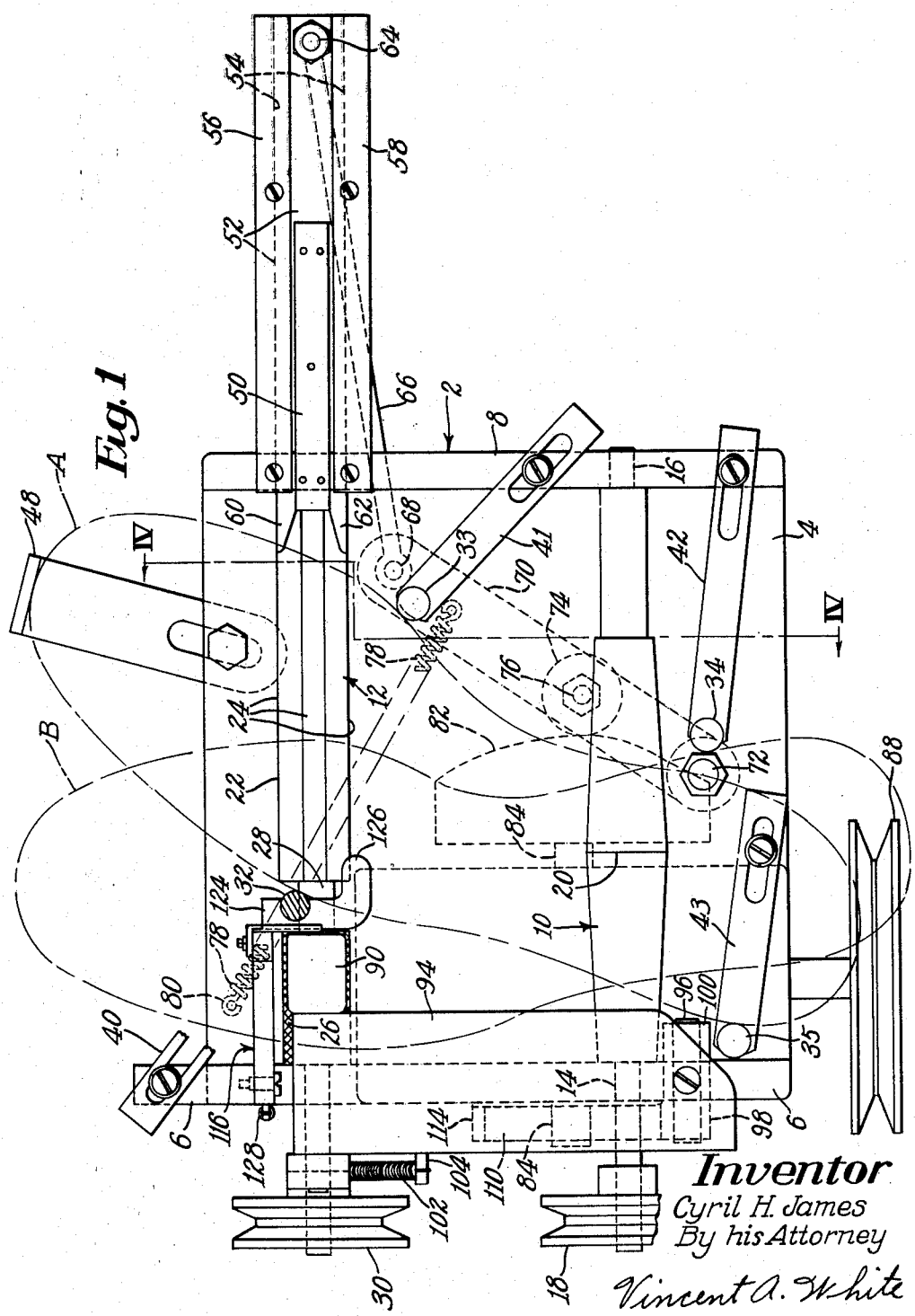

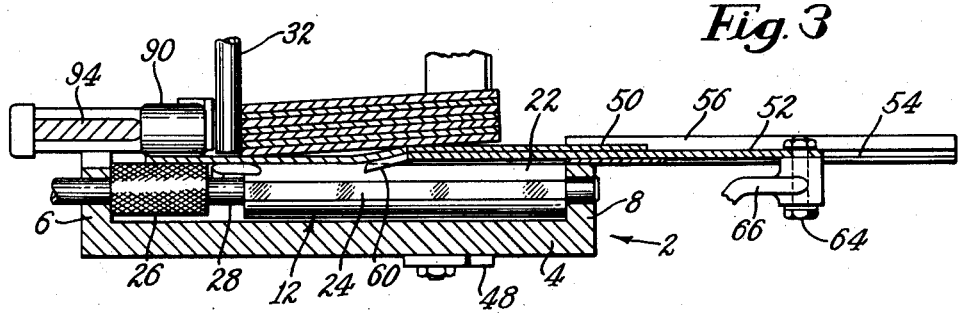
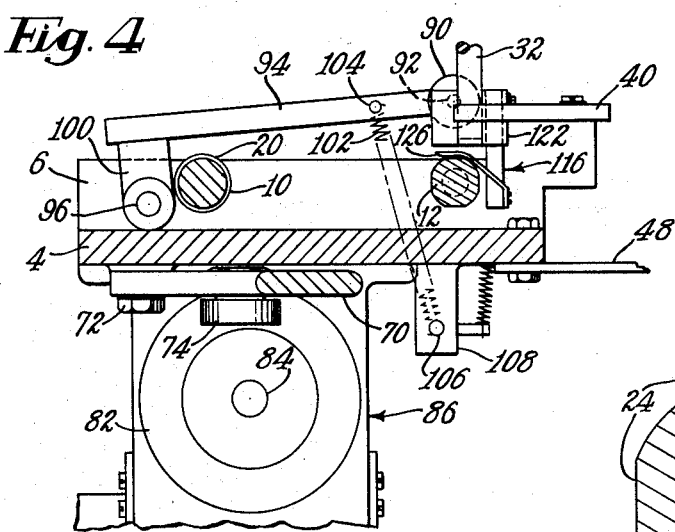
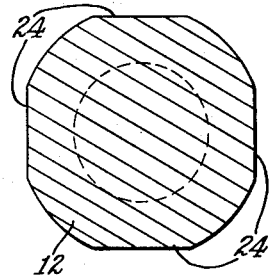
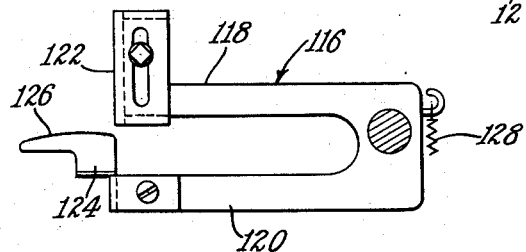

3,106,392
BLANK FEEDING APPARATUS
Cyril Harry James, Leicester, England, assignor to United Shoe Machinery Corporation, Flemington, N.J., a corporation of New Jersey
Filed Sept. 25, 1961, Ser. No. 140,424
Claims priority, application Great Britain Oct. 11, 1960
9 Claims. (Cl. 271—44)

This invention relates to apparatus for feeding blank work pieces of sheet material from a stack. More particularly, the invention is directed to a device for separating and feeding shoe parts, such as sole members, from a stack to a machine for operating on the work piece.

Many machines in general use in the manufacture of shoes operate upon a series of similar work pieces successively, the work pieces being generally presented individually to the machine by an operator. Such manual handling of work pieces is both tiring and time consuming. Automatic presentation where this can be satisfactorily achieved generally reduces the fatigue of an operator and at the same time increases the output of a machine.

Machines are presently available for automatically feeding work pieces, such as shoe soles, in which a transfer head embodying suction means is arranged to grip and transfer to an adjacent machine the topmost work piece of a stack. Such machines are provided with a vertically movable table on which the stack is supported and intermittently raised in timed relation to the operation of the transfer head so the topmost work piece is presented at a level at which it can be engaged by the suction means. While such machines are complex in construction they are generally effective in transferring soles having smooth surfaces to which the suction cups can be engaged. However, great difficulty is encountered when it is desired to operate on soles having surfaces which are not smooth but are irregular in texture. A further disadvantage is encountered with such machines in that the stack supporting table must be lowered to replenish the stack of soles with a resultant loss of time.

It is, therefore, a general object of the invention to provide an improved work feeding apparatus which is simple in construction and which generally overcomes the above noted difficulties. With these objects particularly in mind the apparatus hereinafter described is adapted to feed work pieces, such as shoe soles, successively from the bottom of a stack to an adjacent machine. The apparatus is provided with feeding means which engages the lowermost work piece of a stack holding means preventing feed movement of the entire stack, and means movable in a direction normal to the desired feeding movement to release the work piece from the holding means whereupon the work piece may be fed.

According to one feature of the invention, the apparatus is provided with a spring operated gate which allows only one of the work pieces to be fed during one cycle of operation even though the edges of the work pieces may not be flat. The gate is provided with an opening which is formed at one side by a feeler finger which rises to engage the underside of the lowermost sole of the stack thereby aligning the sole with the opening regardless of the flatness of the sole. According to a further feature, means are provided for vertically vibrating or bouncing the stack to facilitate separation of the lowermost work piece therefrom. Another feature is embodied in the feeding means which include driven rollers tending constantly to feed the lowermost work piece and a presser roll which is intermittently raised and lowered in timed relation to a separating mechanism which separates the work piece from the stack holding means so that the presser roll is immediately depressed after the work piece is separated to cause the feed rolls to feed the work piece.

The above and other features of the invention including various novel details of construction and combinations of parts will now be described with reference to the drawings and thereafter pointed out in the claims.

Figure 2:
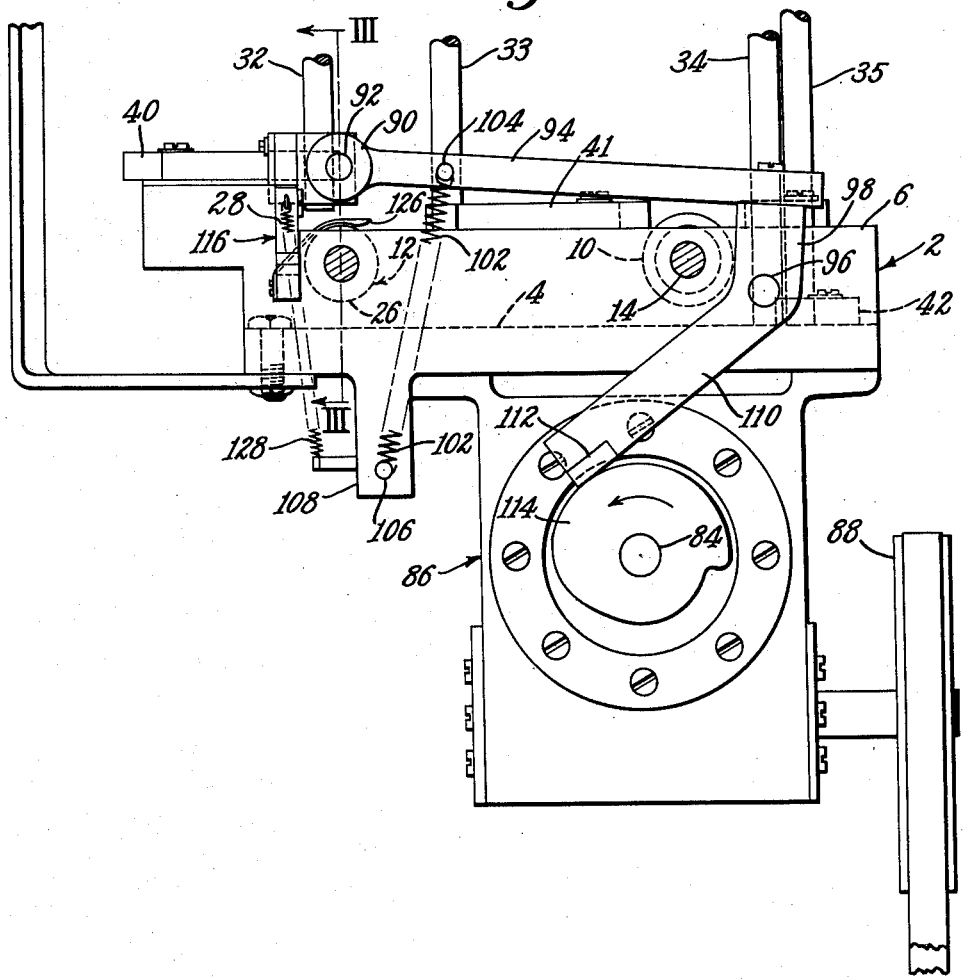

In the drawings,
FIG. 1 is a plan view of an apparatus illustrative of the present invention;
FIG. 2 is a left side elevation of the same apparatus;
FIG. 3 is a section on line III—III of FIG. 2;
FIG. 4 is a section on line IV—IV of FIG. 1;
FIG. 5 is a section on an enlarged scale of one of the stack supporting rolls as seen in FIG. 4; and,
FIG. 6 is a rear elevation of a gate mechanism of the illustrative machine.

The illustrative apparatus comprises a frame 2 consisting of a base plate 4 having at opposite sides upstanding ribs 6 and 8 in which are provided bearings for two parallel stack-supporting rollers 10 and 12. Projecting downwardly from the base plate is a supporting bracket (not shown) by which the apparatus may be secured to a column or bench as desired. The roller 10 has reduced portions 14 and 16 at each end by which it is journaled in the bearings provided in the ribs 6 and 8, respectively. The reduced portion 14 extends beyond the rib 6 to carry a pulley 18 by which the roller is driven. The roller is tapered in two directions from a portion 20 of maximum diameter arranged to engage the mid-portion of the heel end part of the lowermost sole of the stack. In this manner only a small area of the heel end of the lowermost sole is pressed against the adjacent sole as the stack is supported thereon. Furthermore, this method of supporting the heel end part of the stack allows the lowermost sole to pivot easily about this point of engagement as the forepart portion of the sole is pushed from under the stack as hereinafter described.

The roller 12 has a flatted portion 22 arranged to support the forepart portion of the stack of soles and has at the opposite end, i.e., adjacent to the rib 6 a knurled cylindrical portion 26 adapted to feed individual soles as will appear. The portions 22 and 26 are connected by a neck 28 of reduced diameter, the roller also having portions of reduced diameter at each end so as to be journaled in the ribs 6 and 8 and also extending through the rib 6 to carry a pulley 30 by which it is continuously driven.

The stack of soles is positioned obliquely over the rollers 10 and 12 as shown in dashed outline A in FIG. 1 by guide rods 32, 33, 34 and 35 extending vertically up the sides of the stack. The guide rods are secured to support bars 40, 41, 42 and 43, respectively, which are adjustably fixed by screw and slot connections to convenient portions of the frame. A vertically extending stop bar 48 is also adjustably secured to the frame so as to engage the toe end of the stack and prevent the soles when in the oblique position A from being fed forward by the continuously rotating rollers 10, 12. The guide rods and the stop bar can thus be adjusted to control a stack of soles of any particular size. As the rollers 10 and 12 rotate, the stack is stationary horizontally but is continually vibrated vertically due to a plurality of flats 24 about the circumference of the portion 22 of the roll 12. This vibration tends to bounce and separate the soles and eliminates the "dead" weight of the stack, thus facilitating the separation of the lowermost sole when being moved into feeding position as hereinafter described.

The apparatus is provided with a pusher 50 for the purpose of shifting the lowermost sole out of its position A under the stack where it is prevented from being fed by the stop bar 48 to a position clear of the stop bar indicated by the dash line B in FIG. 1. The pusher moves periodically to the left, as seen in FIGS. 1 and 3, into engagement with the edge of the lowermost sole of the stack and continues until the toe end of the sole is clear of the stop bar 48 and the left-hand side portion of the sole is engaged by the knurled portion 26 of the roller 12. The pusher 50 is in the form of a strip secured on the upper side of a member 52 which slides laterally of the apparatus in a guideway 54 provided in a lateral extension of the rib 8 and is retained therein by two plates 56, 58 secured by screws to front and rear walls of the slideway. The left-hand end portion of the slide member 52 which protrudes from the guideway is bifurcated to form two prongs 60, 62 which are inclined downwardly to ensure that, if the edge of the lowermost sole is bent the sole edge shall be correctly engaged by the pusher, the prongs engaging the underside of the sole edge. A stud 64 secured in the member 52 extends downwardly through a slot in the underside of the guideway 54 and is pivotally connected by a link 66 to a second stud 68 fixed in an end portion of a cam follower lever 70. The lever 70 is pivoted at its other end on a screw 72 threaded in the underside of the base plate 4 so as to be capable of swinging movement in a horizontal plane. A cam follower roll 74 is journaled on a downwardly extending stud 76 fixed in an intermediate portion of the lever 70. A spring 78 anchored between the lever 70 and a pin 80 in the underside of the base plate 4 urges the lever in a counterclockwise direction (as seen in FIG. 1) about its fulcrum; and, consequently, also urges the pusher 50 to the left to engage the edge of the sole. This movement is controlled by a cam member 82 which is engaged by the cam follower roll 74. The cam member 82 is secured to an output shaft 84 of a gear reduction unit 86 of known design which is driven by a pulley 88, the unit 86 being secured to the underside of the base plate 4. Since the pusher is spring operated and only returned by positive action of the cam, the sole edge is not likely to be damaged in the event of any obstruction to the sidewise movement of the sole. The point of junction of the prongs 60, 62 with the pusher 50 is arranged to be very slightly above the level of the lower face of the lowermost sole (as shown somewhat exaggerated for clarity in FIG. 3) so that as the pusher engages the sole, the stack is slightly lifted by the raised edge portion of the lowermost sole.

To ensure the forward feeding of the lowermost sole when it has been swung laterally to the position B, a freely rotating presser roll 90 is provided between which and the knurled portion 26 of the roller 12 the sole is engaged and fed forward by the rotation of the roller 12. The roll 90 is mounted for rotation on a horizontally disposed pin 92 (FIGS. 2 and 4) secured in one end of a presser arm 94 which lies over the rib 6. The arm is pivoted on a pin 96 which is secured in the rib and extends outwardly on either side thereof through two lugs 98, 100 depending from the presser arm and straddling the rib 6. The presser arm is urged in a counterclockwise direction, as seen in FIG. 2, about its pivot by a spring 102 extending between a pin 104 in the presser arm and another pin 106 in a downwardly projecting lug 108 on the base plate 4. The presser roll 90 is arranged to be lifted when the sole is being moved into the feeding position B, and for this purpose a cam follower arm 110 is formed on the lug 98. This arm has fixed thereto a block 112 in a position suitable to engage a presser roll lifting cam 114 secured on the end of the shaft 84 opposite to that on which the cam 82 is fixed. The cam 114 is so shaped and its timed relation with the cam 82 is such that as soon as the sole is moved into feeding position over the knurled portion 26 of the constantly rotating roll 12, the presser roll 90 drops onto the sole causing it to be fed longitudinally by the portion 26 and remains in its down position until the sole has passed out of engagement. The pressure arm is then raised by the cam 114 while the pusher is returned to the right (FIG. 1), to commence another pushing motion.

To prevent more than one sole being simultaneously moved over to the feeding position B, a gate lever 116 (FIG. 6), having two spaced parallel arms 118, 120, is pivoted at its left-hand end, as seen in FIG. 1, on an extension of the rib 6. The length of the arms is such that a gate 122 secured at one end of the upper arm 118 and a feeler 124 fixed at the same end of the lower arm 120 extend over the neck 28 of the roller 12. The feeler 124 has formed thereon a finger 126 which extends to the right, as seen in FIG. 1, under the marginal portion of the lowermost sole of the stack when in the oblique position A. The end of the lever 116 carrying the gate and feeler is biased upwardly by a spring 128 acting on the opposite side of the lever pivot to cause the feeler finger to engage the underside of the lowermost sole of the stack. The gate 122 is in the form of a plate secured by a screw and slot connection for vertical adjustment to the arm 118 and is so adjusted by the operator, before the apparatus is set in motion, that the distance between the lower edge of the gate 122 and the upper surface of the feeler 124 is slightly greater than the individual thickness of the soles of the stack, but in any event less than the thickness of two soles together. The arrangement is such that in the event of a sole being upwardly curved at the point of engagement with the gate, the gate rises until the finger is in contact with the underside of the sole in spite of its accidental curvature and the sole can thus pass through the opening between the feeler and the gate to be moved into feeding position B, instead of fouling the gate as would probably occur, if the gate were fixed in position.

In operation, the illustrative apparatus is positioned closely adjacent to the machine in which the soles are to be treated (e.g. a surface scouring machine) in such position that the soles when fed out of the apparatus enter the machine. A stack of soles is placed on the two rollers 10, 12 in the oblique position A and the guide rods adjusted to the sides of the stack taking care that the bottom of the guide rod 32 is above the level of the lowermost sole so as not to obstruct it when it is moved into the feeding position B. The three pulleys 18, 30 and 88 are set in motion being driven by any convenient means, the speeds of the pulleys 18 and 30 being adjusted to agree with the speed of intake of the adjacent machine. As the pulleys rotate, the stack is prevented from horizontal movement by the guide rods and the stop bar 48, and the flats 24 on the roller 12 cause the stack to vibrate eliminating the "dead" weight of the stack on the bottom sole. The presser roll 90 is automatically raised and the pusher 50 moves to the left to pivot the lowermost sole about its point of contact with the tapered roller 10 and to transfer it to the position B. When the sole is in this position, the presser roll 90 snaps down pressing the sole against the knurled portion 26 of the rotating roller 12, whereby the sole is fed into the adjacent machine, the gate 122 preventing all but the lowermost sole being moved to the position B. While the sole is thus being fed towards the adjacent machine the pusher returns to the right in readiness for the subsequent pushing movement.

Having thus described my invention, what I claim as new and desire to secure by Letters Patent of the United States is:

1. In apparatus for feeding individual blanks of sheet material from a stack, a pair of driven rolls underlying and supporting said stack by engagement with the lowermost blank thereof, means holding the blanks in the stack against edgewise feeding movement, said holding means permitting an edgewise separating movement of only said lowermost blank in a direction generally normal to said feeding movement, a gate in the path of said separating movement, said gate having an opening sufficient only to permit the passage of one blank during said separating movement, said opening at its lower side being defined by a finger extending under said stack, means biasing said gate to press the finger against the underside of said lowermost blank thereby aligning the opening with the blank, and means for imparting said separating movement to the blank whereby the blank is separated from the stack and released from the holding means for feeding by said rolls.

2. In apparatus for feeding individual blanks of sheet material from a stack, a pair of driven rolls underlying and supporting said stack by engagement with the lowermost blank thereof, one of said rolls engaging said blank toward its end trailing with respect to a desired feeding movement, said one roll being tapered in two directions so that said blank rests only on the highest point of said one roll, means holding the stack against edgewise feeding movement, said holding means permitting an edgewise swinging movement of only said lowermost blank in a direction generally normal to said feeding movement, a gate in the path of said swinging movement, said gate having an opening sufficiently only to permit passage of one blank in said swinging movement, said opening at its lower side being defined by a finger extending under said stack, means biasing said gate to engage the finger with the underside of said lowermost blank thereby aligning the opening with the blank, and means for swinging said lowermost blank about its point of engagement with said first roll and through said gate, whereby the blank is separated from the stack and released from the holding means for feeding by said rolls.

3. In apparatus for feeding individual blanks of sheet material from a stack, a pair of driven feed rolls underlying and supporting said stack by engagement with the lowermost blank thereof, one of said rolls having a plurality of flats about its circumference for vibrating and bouncing the stack vertically as said rolls rotate, means holding the blanks against edgewise feeding movement and in vertical superposed alignment, said holding means permitting an edgewise separating movement of only said lowermost blank in a direction generally normal to said feeding movement, a gate in the path of said separating movement, said gate having an opening sufficient only to permit the passage of one blank during said separating movement, said opening at its lower side being defined by a finger extending from the gate and under said stack, means biasing said gate to engage the finger with the underside of said lowermost blank thereby aligning the opening with the blank to permit its edgewise separating movement, and means for imparting said separating movement to the blank, whereby the blank is separated from the stack and released from the holding means for feeding by said rolls.

4. In apparatus for feeding individual blanks of sheet material from a stack, a pair of driven feed rolls underlying and supporting said stack by engagement with the lowermost blank thereof, one of said rolls engaging said blank toward its end trailing with respect to a desired feeding movement, said one roll being tapered in two directions so that the blank rests only on the highest point of said one roll, the other of said rolls having a plurality of flats about its circumference for vibrating and bouncing the stack vertically as the roll rotates, means holding the blanks against edgewise feeding movement and in vertical superposed alignment, said holding means permitting an edgewise swinging movement of said lowermost blank in a direction generally normal to said feeding movement, a gate in the path of said swinging movement, said gate having an opening sufficient only to permit passage of the blank during its swinging movement, said opening at its lower side being defined by a finger extending from the gate and under said stack, means biasing said gate to engage the finger with the underside of said lowermost blank thereby aligning the opening with the blank, and means for swinging said lowermost blank about its point of engagement with said first roll, whereby the blank is separated from the stack, swung through said gate and released from the holding means for feeding by said rolls.

5. In apparatus for feeding individual blanks of sheet material from a stack, a pair of driven rolls underlying and supporting said stack by engagement with the lowermost blank thereof, one of said rolls having a portion which underlies the stack and is provided with a plurality of flats about its circumference for vibrating the stack vertically as said roll rotates, said one roll also having another portion extending beyond said stack, means holding the blanks against edgewise feeding movement and in vertical superposed alignment, said holding means permitting an edgewise separating movement of only the lowermost blank in a direction generally normal to said feeding movement, a gate in the path of said separating movement, said gate having an opening sufficient only to permit passage of one blank during its separating movement, said opening at its lower side being defined by a finger extending under said stack, means biasing said gate so that the finger is pressed against the underside of said lowermost blank, thereby aligning the opening with the blank, means for imparting to the blank said separating movement, whereby the blank is separated from the stack, released from the holding means and moved into engagement with the other portion of said one roll, a pressure roll adapted to press said blank against said other portion, and means for raising the pressure roll during the separating movement of said blank and for depressing said roll after the blank is separated from the holding means for causing said blank to be fed.

6. In apparatus for feeding blanks of sheet material from a stack, gate means restraining the blanks of the stack against edgewise movement, said gate means having an opening sufficient only for edgewise passage of one blank, one side of said opening being defined by a finger which extends from the gate means and beyond the margin of the exposed face of the endmost blank of the stack, means biasing said gate means for engaging the finger with said face to align the opening with the edge of the endmost blank, and means for moving said endmost blank edgewise from the stack through the opening, whereby only the endmost blank is separated and fed from the stack.

7. In apparatus for feeding blanks of sheet material from a stack, gate means restraining the blanks of the stack against edgewise movement, said gate means having an opening sufficient only for edgewise passage of one blank, one side of said opening being defined by a finger which extends from the gate means and beyond the margin of the exposed face of the endmost blank of the stack, means biasing said gate means for engaging the finger with said face to align the opening with the edge of the endmost blank, means for moving said endmost blank edgewise from the stack through the opening, whereby only the endmost blank is separated and fed from the stack, and means for vibrating the stack in directions generally normal to the edgewise blank movement causing said blanks to bounce apart thereby reducing the surface engagement between individual blanks to facilitate their edgewise movement.

8. In apparatus for feeding blanks of sheet material individually from a stack, driven feed rolls engaging the exposed surface of the endmost blank of the stack, one of said rolls adjacent the trailing end of said blank being tapered in two directions so the blank engages only the highest point of said one roll, stack holding means restraining said blanks against edgewise feeding forces caused by rotation of said rolls, and means for swinging the leading end of said blank edgewise about its point of engagement with said one roll and away from said holding means thereby releasing said blank to the feeding action of said rolls.

9. In apparatus for feeding blanks of sheet material individually from a stack, driven feed rolls engaging the exposed surface of the endmost blank of the stack, holding means aligning the blanks superposed in a stack disposed obliquely to a desired feed path and restraining said endmost blank against edgewise feeding forces caused by rotation of said rolls, and means for swinging the leading end of said endmost blank edgewise out of engagement with the holding means and into said path thereby releasing said blank to the feeding action of said rolls.

References Cited in the file of this patent

UNITED STATES PATENTS

| | | |
|---|---|---|
| 1,291,074 | Milmoe et al. | Jan. 14, 1919 |
| 2,468,842 | Sporleder | May 3, 1949 |
| 2,631,851 | Jones | Mar. 17, 1953 |
| 2,642,285 | Baker et al. | June 16, 1953 |